United States Patent
Lee et al.

(10) Patent No.: US 10,013,596 B2
(45) Date of Patent: Jul. 3, 2018

(54) FINGERPRINT RECOGNITION APPARATUS

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 123 days.

(21) Appl. No.: 15/204,388

(22) Filed: Jul. 7, 2016

(65) Prior Publication Data

US 2017/0098113 A1    Apr. 6, 2017

(30) Foreign Application Priority Data

Jul. 31, 2015  (TW) .............................. 104124849 A

(51) Int. Cl.
G06K 9/00    (2006.01)

(52) U.S. Cl.
CPC ....... G06K 9/00087 (2013.01); G06K 9/0002 (2013.01)

(58) Field of Classification Search
CPC ............. G06K 9/0002; G06K 9/00087; G06K 19/0718; G06K 19/07
USPC ...................................................... 382/124
See application file for complete search history.

(56) References Cited

U.S. PATENT DOCUMENTS

| | | | | |
|---|---|---|---|---|
| 6,960,790 | B2 * | 11/2005 | Miyai | G06K 9/00053 257/77 |
| 7,822,239 | B2 * | 10/2010 | Chou | G06K 9/00053 382/124 |
| 7,989,938 | B2 | 8/2011 | Okada et al. | |
| 8,717,775 | B1 | 5/2014 | Bolognia et al. | |
| 2008/0085038 | A1 | 4/2008 | Huang et al. | |
| 2013/0279769 | A1 * | 10/2013 | Benkley, III | G06K 9/00013 382/124 |
| 2017/0154200 | A1 * | 6/2017 | Benkley, III | G06K 9/0002 |

FOREIGN PATENT DOCUMENTS

TW            M513407 U       12/2015

OTHER PUBLICATIONS

Office Action dated Jun. 7, 2016 of the corresponding Taiwan patent application.

* cited by examiner

*Primary Examiner* — Daniel Mariam
(74) *Attorney, Agent, or Firm* — Chun-Ming Shih; HDLS IPR Services

(57) ABSTRACT

A fingerprint recognition apparatus includes an electrode-and-wiring substrate having two main surfaces opposite to each other, where one main surface is in proximity to user finger and the electrode-and-wiring substrate has a plurality of sensing electrodes on the other main surface. The fingerprint recognition apparatus further includes an integrated circuit (IC) chip having a fingerprint sensing circuit and a plurality of metal bumps. At least part of the metal bumps are electrically connected to the fingerprint sensing circuit and corresponding sensing electrodes on the electrode-and-wiring substrate, whereby the fingerprint sensing circuit is electrically connected to the sensing electrodes.

19 Claims, 10 Drawing Sheets

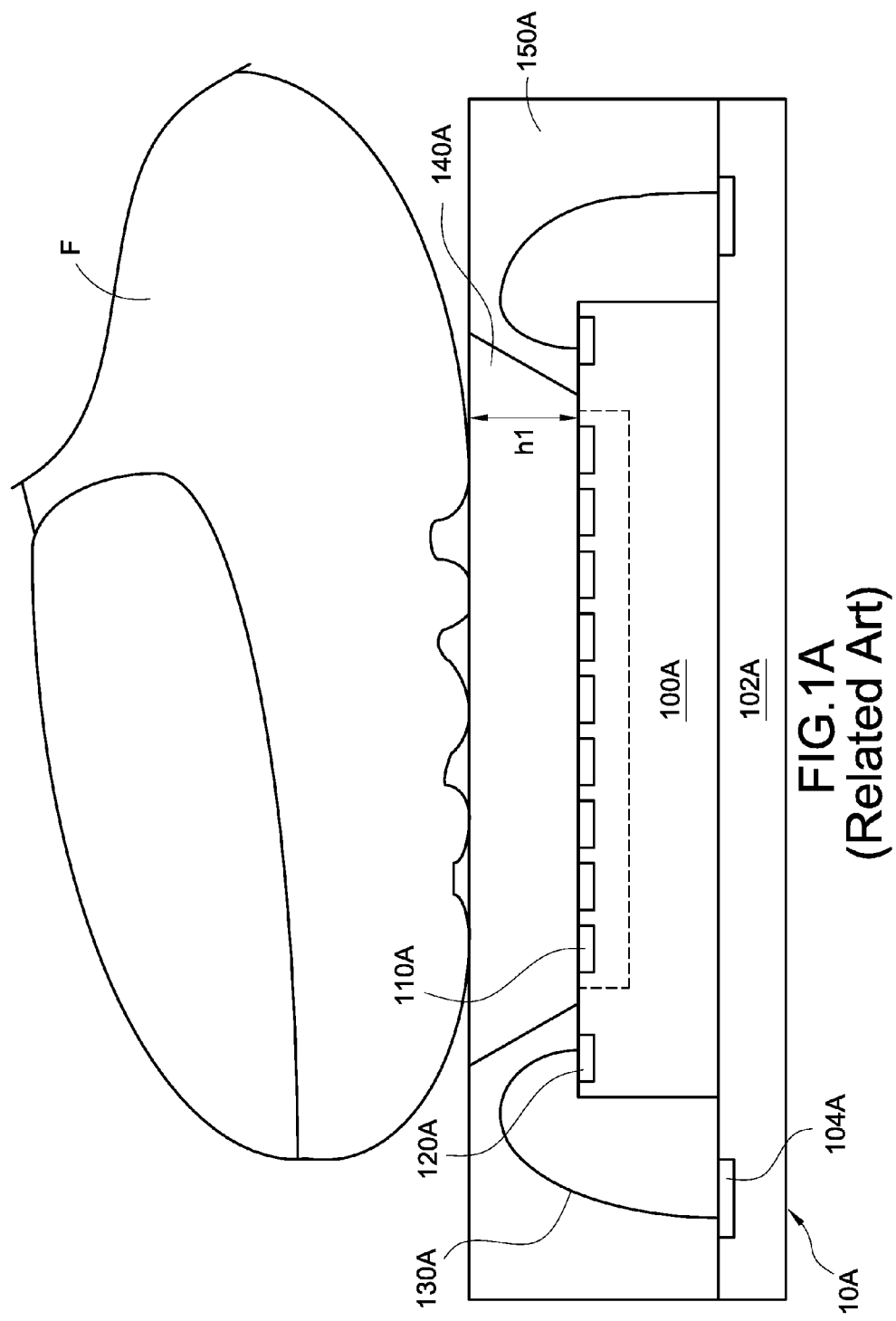

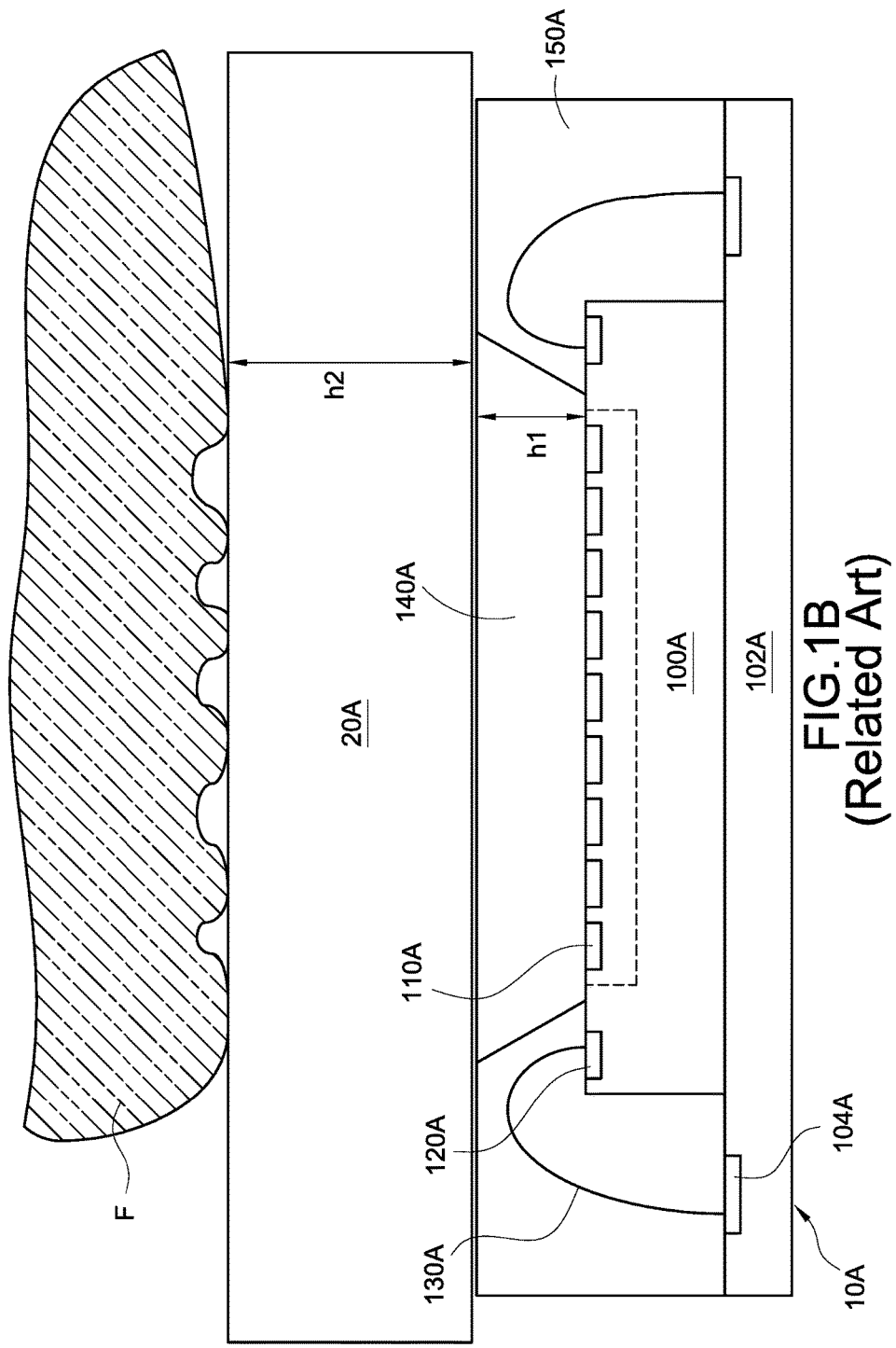

FINGERPRINT RECOGNITION APPARATUS

BACKGROUND OF THE INVENTION

Field of the Invention

The present invention relates to fingerprint recognition apparatus, especially to a fingerprint recognition apparatus with high sensitivity.

Description of Related Art

Biometric recognition technologies have rapid development due to the strong request from electronic security applications and automatic access control system. The biometric recognition technologies can be classified into fingerprint recognition, iris recognition, DNA recognition, and so on. For the considerations of efficiency, safety and non-invasiveness, the fingerprint recognition becomes main stream technology. The fingerprint recognition device can scan fingerprint image by optical scanning, thermal imaging or capacitive imaging. For cost, power-saving, reliability and security concerns, the capacitive fingerprint sensor becomes popular for biometric recognition technology applied to portable electronic devices.

The conventional capacitive fingerprint sensors can be classified into swipe type and area type (pressing type), and the area type has better identification correctness, efficiency and convenience. However, the area type capacitive fingerprint sensor generally integrates the sensing electrodes and the sensing circuit into one integrated circuit (IC). FIG. 1A shows a sectional view of a related art capacitive fingerprint sensor, which comprises a package substrate 102A, a fingerprint recognition IC 100A and a sapphire protection film 140A. The fingerprint recognition IC 100A is arranged on the package substrate 102A and has a sensing area with a plurality of sensing electrodes 110A. The sensing electrodes 110A are arranged on a surface of the fingerprint recognition IC 100A, which is closer to the user finger. The conductive pads 120A of the fingerprint recognition IC 100A are electrically connected to the corresponding conductive pads 104A on the package substrate 102A through the lead-out wires 130A. To protect the lead-out wires 130A, a sealing resin 150A is used to encapsulate the lead-out wires 130A. However, the distance between the finger and the sensing electrodes 110A will be increased by the height h1 (in the order of tens of micro meters), and this has great impact on the sensing accuracy. The area along the height h1 needs to be filled with expensive sapphire protection film 140A with high dielectric constant. This will increase cost and the extra distance h1 renders the capacitive fingerprint sensors difficult to be integrated below the protection glass.

FIG. 1B is a sectional view of another related art capacitive fingerprint sensor, where the capacitive fingerprint sensor is packaged into an electronic device with a protection glass 20A having thickness h2. Due to the protection glass 20A, the distance between the finger and the sensing electrodes 110A will be increased by the height (h1+h2). A common solution to reduce the distance is to dig hole in the protection glass 20A and then embed the fingerprint recognition IC 100A into the hole. However, material cost and fabrication complexity are increased while the yield, lifetime and durability of the product are reduced. It is development trend to enhance sensing accuracy and signal-to-noise ratio to advantageously increase the distance between the finger and the sensing electrodes. Moreover, it is desirable to place the fingerprint recognition IC below the protection glass to reduce cost and enhance the lifetime and durability of the products.

It is an object of the present invention to provide a fingerprint recognition apparatus with low cost and high performance. The sensed signals are led out through metal bumps to reduce the sensing distance by tens of micro meter, which is caused by the conventional lead-out wire. The packaging complexity and cost are reduced while the sensing accuracy is enhanced. Another object of the present invention is to provide a fingerprint recognition apparatus with flexible and simple process.

SUMMARY OF THE INVENTION

According to one aspect of the present invention, the present invention provides a fingerprint recognition apparatus, comprising: an electrode-and-wiring substrate having two main surfaces opposite to each other, where one main surface is in proximity to user finger and the electrode-and-wiring substrate has a plurality of sensing electrodes on the other main surface; an integrated circuit (IC) chip having a fingerprint sensing circuit and a plurality of metal bumps, at least part of the metal bumps electrically connected with the fingerprint sensing circuit and corresponding sensing electrodes on the electrode-and-wiring substrate, whereby the fingerprint sensing circuit is electrically connected to the sensing electrodes.

According to another aspect of the present invention, the present invention provides a fingerprint recognition apparatus, comprising: a wiring substrate having two main surfaces opposite to each other, where one main surface is in proximity to user finger and the wiring substrate has a plurality of conductive pads and conductive wires on the other main surface; and an integrated circuit (IC) chip having a fingerprint sensing circuit, a plurality of sensing electrodes and a plurality of metal bumps, the fingerprint sensing circuit electrically connected with the sensing electrodes, wherein the fingerprint sensing circuit is electrically connected with parts of the conductive pads and part of the conductive wires on the wiring substrate, whereby the fingerprint sensing circuit is electrically connected to an external electric circuit.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

FIG. 1A is a sectional view of a related art capacitive fingerprint sensor.

FIG. 1B is a sectional view of another related art capacitive fingerprint sensor.

DETAILED DESCRIPTION OF THE INVENTION

Figure 2:
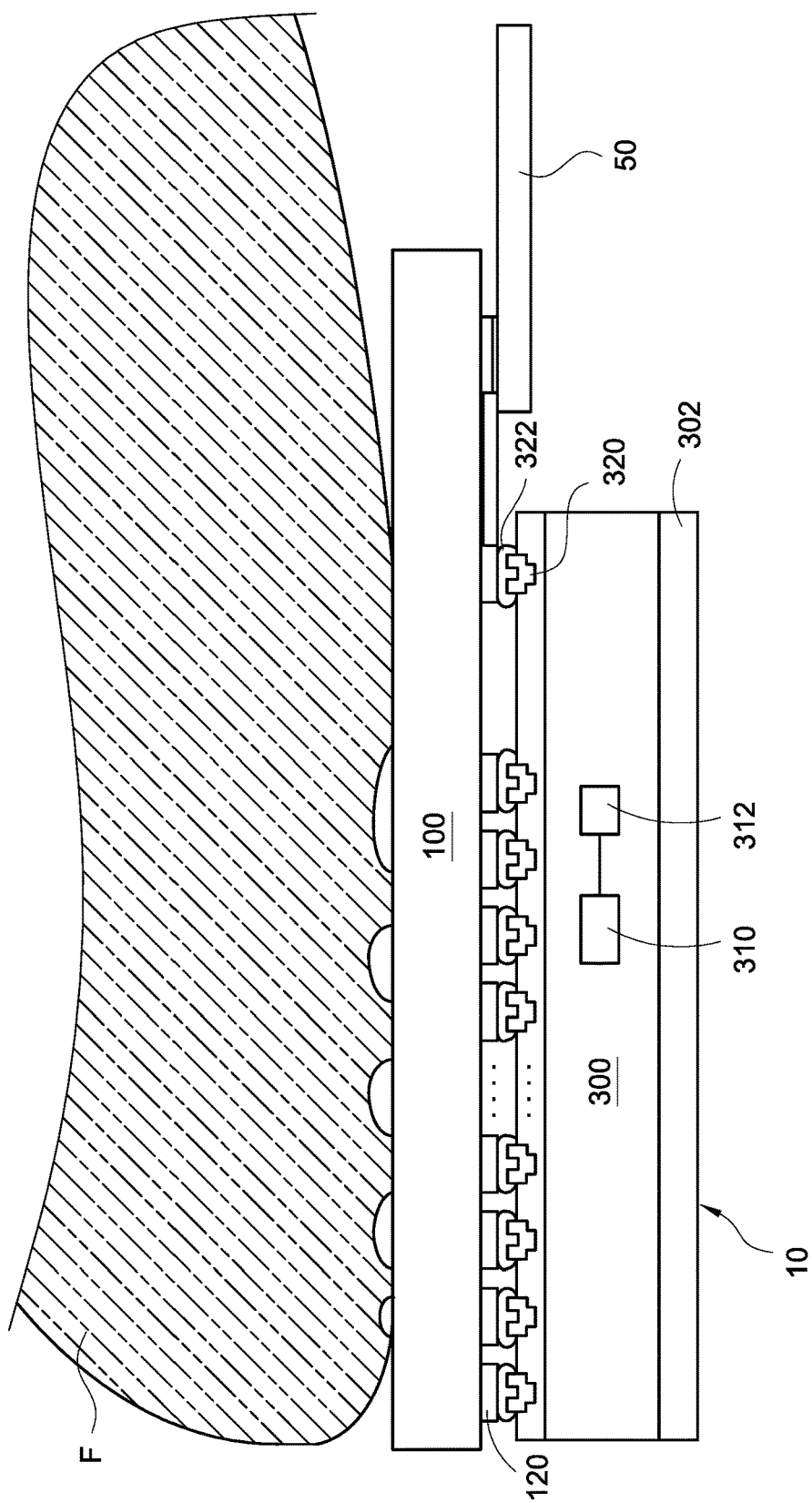
FIG. 2 is a sectional view of the fingerprint recognition apparatus according to the first embodiment of the present invention.
Figure 3:
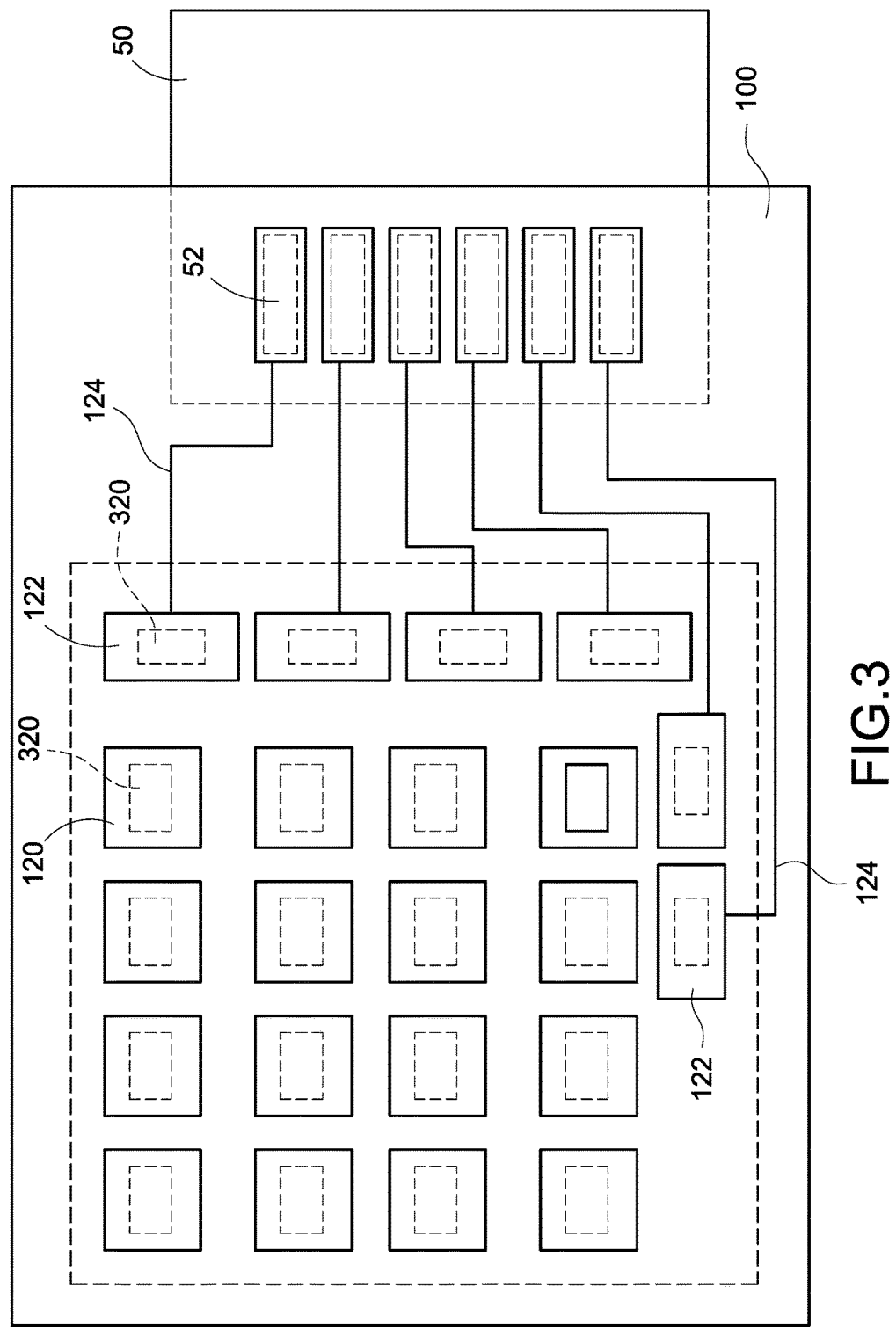
FIG. 3 shows the top view of the fingerprint recognition apparatus according to the first embodiment of the present invention.

FIG. 2 is a sectional view of the fingerprint recognition apparatus according to the first embodiment of the present invention, and FIG. 3 shows the top view of the fingerprint recognition apparatus according to the first embodiment of the present invention. In the first embodiment, the fingerprint recognition apparatus is, for example, a self-capacitance fingerprint recognition apparatus. The fingerprint recognition apparatus 10 mainly comprises an electrode-and-wiring substrate 100 and an integrated circuit (IC) chip 300. The electrode-and-wiring substrate 100 has two main surfaces opposite to each other, where one main surface is in proximity to user finger F and the other main surface has a plurality of sensing electrodes 120 arranged thereon. The IC chip 300 is arranged on a substrate 302 and comprises a fingerprint sensing circuit 310 and a plurality of metal bumps 320 electrically connected with the fingerprint sensing circuit 310. The metal bumps 320 are arranged on a surface of the IC chip 300, which is away from the substrate 302, and the metal bumps 320 are corresponding to the sensing electrodes 120 on the electrode-and-wiring substrate 100. Moreover, at least part of the metal bumps 320 may be electrically connected to the corresponding sensing electrodes 120 on the electrode-and-wiring substrate 100 through anisotropic conductive film (ACF) 322. Moreover, the fingerprint recognition apparatus 10 further comprises an external circuit board 50 arranged on the surface of the electrode-and-wiring substrate 100, on which the sensing electrodes 120 are arranged. The external circuit board 50 may be a flexible printed circuit board or a rigid printed circuit board, and electrically connected with the electrode-and-wiring substrate 100 through conductive pads 52, which will be detailed later.

With reference to FIG. 3, the fingerprint recognition apparatus 10 is viewed from the finger pointing direction. The sensing electrodes 120 on the electrode-and-wiring substrate 100 are arranged, for example, in array manner. An area of each of the metal bumps 320 is not larger than an area of corresponding one of the sensing electrodes 120. Each of the sensing electrodes 120 is electrically connected with the fingerprint sensing circuit 310 of the IC chip 300 through the corresponding metal bumps 320. Moreover, the fingerprint sensing circuit 310 can be selectively connected with the sensing electrodes 120 through the connection of the metal bumps 320 and performs self-capacitance fingerprint sensing by sensing the detected signal respectively from the sensing electrodes 120. The technique of self-capacitance fingerprint sensing is well known art and is not detailed here for brevity. The metal bumps 320 can be formed by directly placing tin solder or gold on the electric pads (not shown) of the IC chip 300 through thin film process, chemical plating process, electrical plating process or printing process, thus providing electric connection mechanism with fine pitch, low inductance, low cost and good thermal dissipation. The metal bumps 320 are, for example, gold bumps or solder bumps. With reference also to FIG. 2, each of the sensing electrodes 120 is electrically connected with the corresponding metal bump 320 through ACF 322. With reference again to FIG. 3, the electrode-and-wiring substrate 100 further comprises a plurality of conductive pads 122 and a plurality of conductive wires 124. At least part of the conductive pads 122 are electrically connected with the conductive pads 52 of the external circuit board 50 and another part of the conductive pads 122 are electrically connected with the metal bumps 320 and further electrically connected with the fingerprint sensing circuit 310 of the IC chip 300 through the metal bumps 320, thus achieving the electric connection between the fingerprint sensing circuit 310 of the IC chip 300 and the external circuit board 50 and transmitting the sensed signal of the fingerprint sensing circuit 310 out of the IC chip 300. Moreover, in the first embodiment shown in FIGS. 2 and 3, the electrode-and-wiring substrate 100 can be glass substrate (such as protection glass of display apparatus), ceramic substrate, sapphire substrate or polymer film. The thickness of the electrode-and-wiring substrate 100 can be reduced to several micro meters, which is one order of magnitude less than that of sealing resin 150A. The sealing resin 150A needs thickness of tens of micro meters to protect the lead-out wires 130A. Therefore, the fingerprint recognition apparatus 10 of the present invention has enhanced measurement sensitivity and lower cost.

Figure 4:
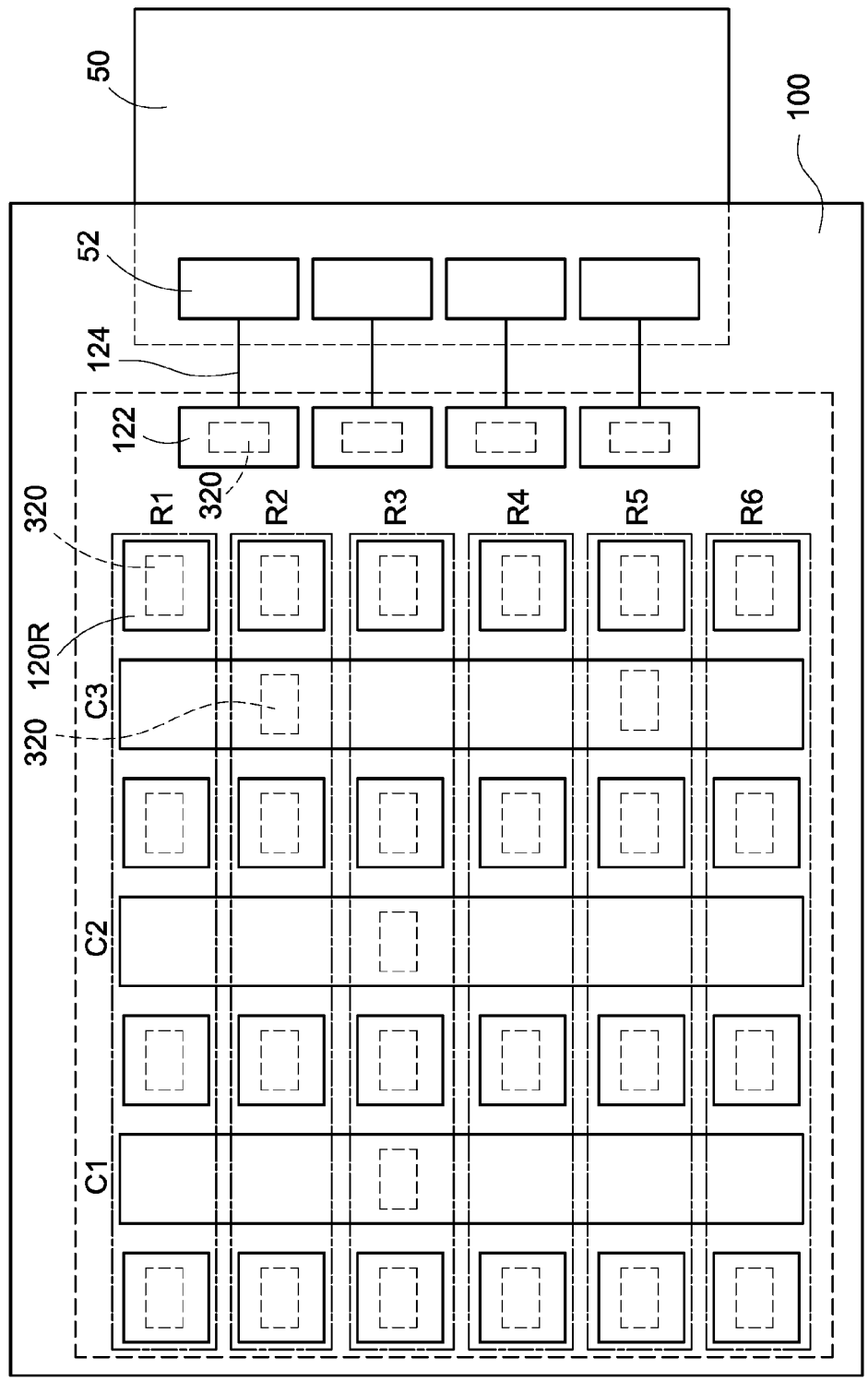
FIG. 4 shows the top view of the fingerprint recognition apparatus according to the second embodiment of the present invention.

FIG. 4 shows the top view of the fingerprint recognition apparatus 10 according to the second embodiment of the present invention. The sectional view of the second embodiment of the present invention can be referred to the structure shown in FIG. 2. More particularly, the fingerprint recognition apparatus 10 in FIG. 4 is viewed from the finger pointing direction and can be used for mutual-capacitance fingerprint sensing. The sensing electrodes on the electrode-and-wiring substrate 100 includes row sensing electrodes R1~R6 arranged in row by row manner, and column sensing electrodes C1~C3 of stripe shape. Each of the row sensing electrodes R1~R6 comprises a plurality of sensing electrodes 120R and the sensing electrodes 120R in each of the row sensing electrodes R1~R6 are respectively separated by the column sensing electrodes C1~C3 of stripe shape. Moreover, each of the sensing electrodes 120R in the row sensing electrodes R1~R6 is electrically connected to the IC chip 300 through corresponding metal bump 320 and the sensing electrodes 120R are assigned to respective row by the switch circuit 312 (see FIG. 2) in the IC chip 300. Moreover, each of the column sensing electrodes C1~C3 is electrically connected to the IC chip 300 through the corresponding metal bump 320. The fingerprint sensing circuit 310 of the IC chip 300 sequentially sends signal to the column sensing electrodes C1~C3 and then sequentially receives fingerprint sensed signal from the row sensing electrodes R1~R6, thus achieving mutual-capacitance fingerprint sensing. Alternatively, the fingerprint sensing circuit 310 of the IC chip 300 can also sequentially send signal to the row sensing electrodes R1~R6 and then sequentially receive fingerprint sensed signal from the column sensing electrodes C1~C3, thus also achieving mutual-capacitance fingerprint sensing. Moreover, even not clearly shown in this figure, the fingerprint recognition apparatus 10 according to the second embodiment of the present invention may have similar relationship between the electrode-and-wiring substrate 100 and the IC chip 300 as that shown in FIG. 2. Namely, the IC chip 300 also has the substrate 302, the fingerprint sensing circuit 310 and the switch circuit 312. The electrode-and-wiring substrate 100 further comprises a plurality of conductive pads 122 and a plurality of conductive wires 124. At least part of the conductive pads 122 are electrically connected with the conductive pads 52 of the external circuit board 50 and another part of the conductive pads 122 are electrically connected with the metal bumps 320 and further electrically connected with the fingerprint sensing circuit 310 of the IC chip 300 through the metal bumps 320, thus achieving the electric connection between the fingerprint sensing circuit 310 of the IC chip 300 and the external circuit board 50 and transmitting the sensed mutual capacitance signal of the fingerprint sensing circuit 310 out of the IC chip 300.

Figure 5:
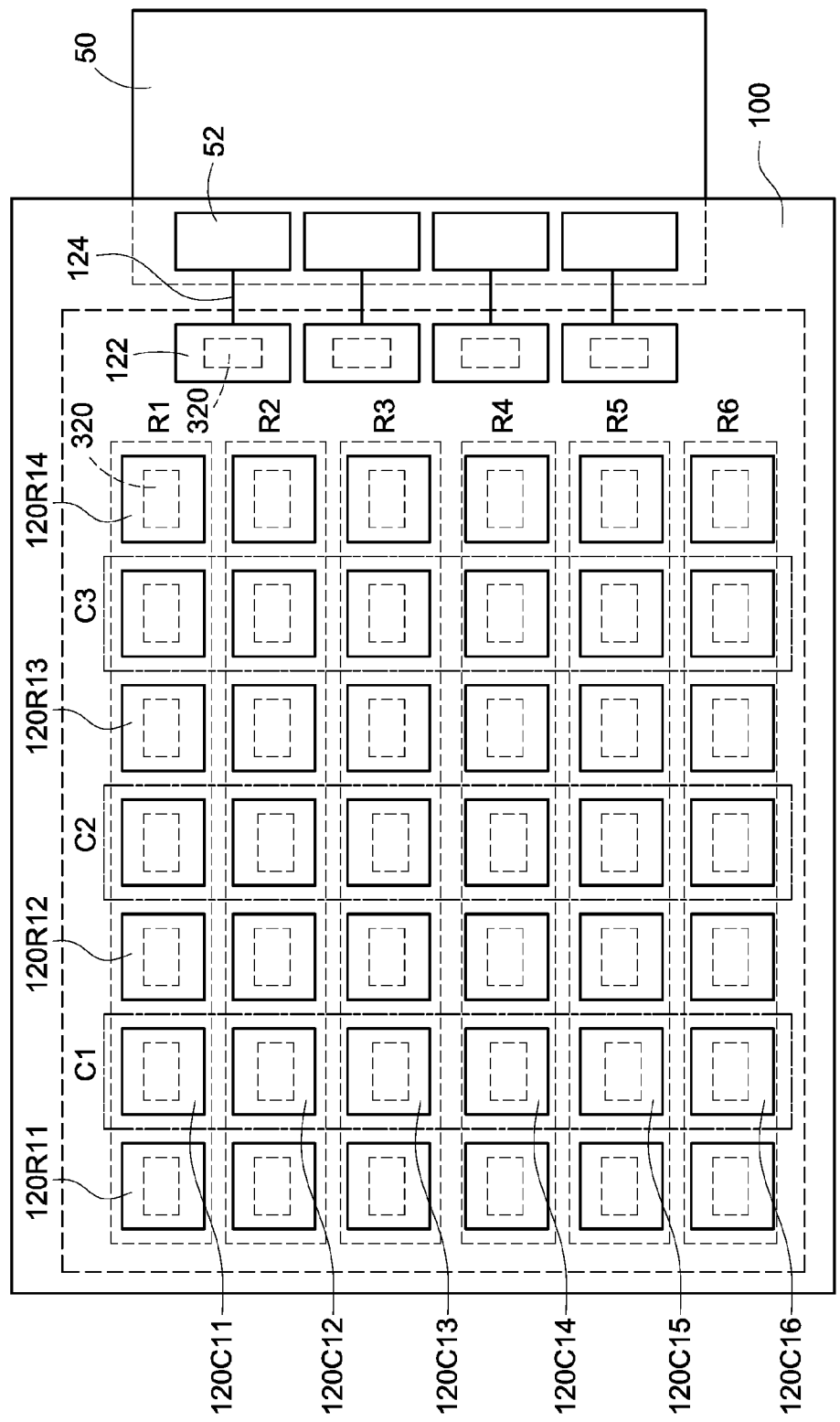
FIG. 5 shows the top view of the fingerprint recognition apparatus according to the third embodiment of the present invention.

FIG. 5 shows the top view of the fingerprint recognition apparatus 10 according to the third embodiment of the present invention. The sectional view of the third embodiment of the present invention can be referred to the structure shown in FIG. 2. More particularly, the fingerprint recognition apparatus 10 in FIG. 5 is viewed from the finger pointing direction and can be used for self-capacitance fingerprint sensing or mutual-capacitance fingerprint sensing. The sensing electrodes in FIG. 5 is similar to those shown in FIG. 3, namely, the sensing electrodes are arranged in array manner. Therefore, the embodiment shown in FIG. 5 can be used for self-capacitance fingerprint sensing. Moreover, the embodiment shown in FIG. 5 can also be used for mutual-capacitance fingerprint sensing by following way, namely, grouping the sensing electrodes respectively into row sensing electrodes and column sensing electrodes. The sensing electrodes are selected though the switch circuits 312 (see FIG. 2) in the IC chip 300 to function as row sensing electrodes R1~R6 arranged in individual row, and column sensing electrodes C1~C3 arranged in individual column. As shown in FIG. 5, the switch circuits 312 in the IC chip 300 electrically connects the sensing electrodes 120R11, 120R12, 120R13 and 120R14 to constitute the row sensing electrode R1. Similarly, the switch circuits 312 in the IC chip 300 electrically connects the sensing electrodes 120C11, 120C12, 120C13, 120C14, 120C15 and 120C16 to constitute the column sensing electrode C1. The formation of the remaining row sensing electrode R2~R6 and the column sensing electrode C2~C3 can be made in similar manner, and the detailed description is omitted here for brevity. Each of the row sensing electrodes R1~R6 comprises a plurality of sensing electrodes 120R and each of the column row sensing electrodes C1~C3 comprises a plurality of sensing electrodes 120C. The sensing electrodes 120R in each of the row sensing electrodes R1~R6 are respectively separated by the column sensing electrodes C1~C3 arranged column by column, and the sensing electrodes 120C in each of the column sensing electrodes C1~C3 are respectively separated by the row sensing electrodes R1~R6 arranged row by row. Similarly, the fingerprint sensing circuit 310 of the IC chip 300 sequentially sends signal to the column sensing electrodes C1~C3 and then sequentially receives fingerprint sensed signal from the row sensing electrodes R1~R6, or vice versa (sequentially sends signal to the row sensing electrodes R1~R6 and then sequentially receives fingerprint sensed signal from the column sensing electrodes C1~C3), thus achieving mutual-capacitance fingerprint sensing. FIG. 5 only depicts an illustrated example, while the number of rows (columns) in the sensing electrodes can be adjusted and not limited to the specific example (3 columns and 6 rows). Moreover, even not clearly shown in this figure, the fingerprint recognition apparatus 10 according to the third embodiment of the present invention may have similar relationship between the electrode-and-wiring substrate 100 and the IC chip 300 as that shown in FIG. 2. Namely, the IC chip 300 also has the substrate 302, the fingerprint sensing circuit 310 and the switch circuit 312. The electrode-and-wiring substrate 100 further comprises a plurality of conductive pads 122 and a plurality of conductive wires 124. At least part of the conductive pads 122 are electrically connected with the conductive pads 52 of the external circuit board 50 and another part of the conductive pads 122 are electrically connected with the metal bumps 320 and further electrically connected with the fingerprint sensing circuit 310 of the IC chip 300 through the metal bumps 320, thus achieving the electric connection between the fingerprint sensing circuit 310 of the IC chip 300 and the external circuit board 50 and transmitting the sensed mutual capacitance signal of the fingerprint sensing circuit 310 out of the IC chip 300.

Figure 6:
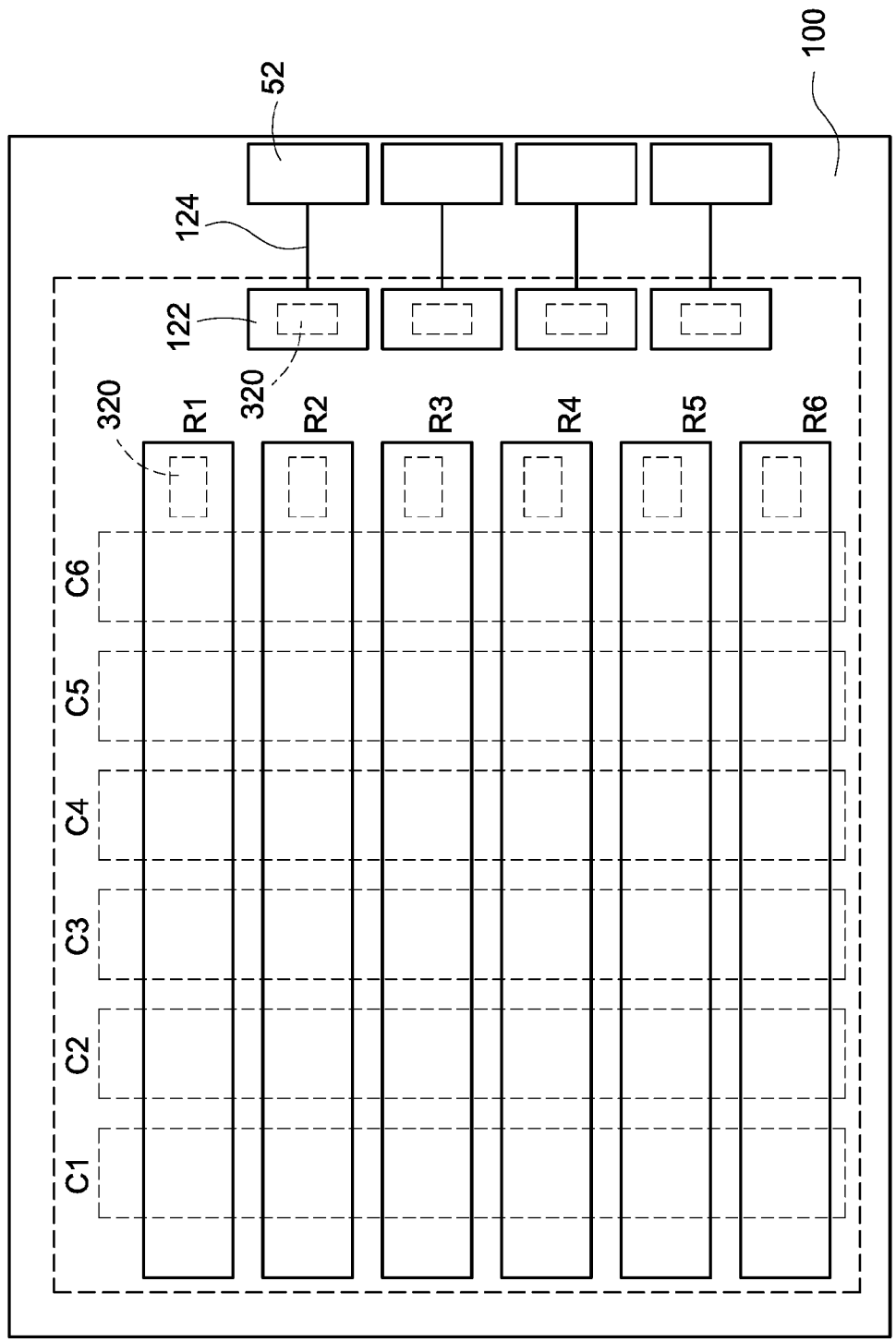
FIG. 6 shows the top view of the fingerprint recognition apparatus according to the fourth embodiment of the present invention.

FIG. 6 shows the top view of the fingerprint recognition apparatus 10 according to the fourth embodiment of the present invention. The sectional view of the fourth embodiment of the present invention can be referred to the structure shown in FIG. 2. More particularly, the fingerprint recognition apparatus 10 in FIG. 6 is viewed from the finger pointing direction and can be used for mutual-capacitance fingerprint sensing. The fingerprint recognition apparatus 10 further comprises a plurality of row sensing electrodes R1~R6 of stripe shape on the electrode-and-wiring substrate 100. Moreover, the fingerprint recognition apparatus 10 further comprises an IC chip 300 below the electrode-and-wiring substrate 100. The IC chip 300 comprises a plurality of column sensing electrodes C1~C3 of stripe shape arranged on the IC chip 300, a substrate 302 and a fingerprint sensing circuit 310. From top projection view, the row sensing electrodes R1~R6 and the column sensing electrodes C1~C3 are substantially cross (vertical) to each other and arranged on different planes. The column sensing electrodes C1~C3 on the IC chip 300 are electrically connected with the fingerprint sensing circuit 310. Each of the row sensing electrodes R1~R6 on the electrode-and-wiring substrate 100 is electrically connected with the underlying fingerprint sensing circuit 310 through the corresponding metal bump 320. Similarly, the fingerprint sensing circuit 310 of the IC chip 300 sequentially sends signal to the column sensing electrodes C1~C3 on the IC chip 300 and then sequentially receives fingerprint sensed signal from the row sensing electrodes R1~R6 arranged on the electrode-and-wiring substrate 100, thus achieving mutual-capacitance fingerprint sensing. In this embodiment, part of the sensing electrodes are arranged on the IC chip 300, therefore, the number of the metal bumps 320 can be reduced. Moreover, each of the row sensing electrodes R1~R6 on the electrode-and-wiring substrate 100 is of stripe shape and is not constituted by an array of sensing electrodes, the number of the metal bumps 320 can be further reduced. The sensing electrodes depicted in FIG. 6 are of stripe shape for illustration and are not to limit the scope of the present invention. For example, each of the sensing electrodes can be constituted by serially-connected rhombic electrodes to increase effective mutual capacitance between row sensing electrodes or between column sensing electrodes. Moreover, each of the sensing electrodes can be constituted by serially-connected electrodes of other shapes to increase effective mutual capacitance between row sensing electrodes or between column sensing electrodes. The electrode-and-wiring substrate 100 further comprises a plurality of conductive pads 122 and a plurality of conductive wires 124. At least part of the conductive pads 122 are electrically connected with the conductive pads 52 of the external circuit board 50 and another part of the conductive pads 122 are electrically connected with the metal bumps 320 and further electrically connected with the fingerprint sensing circuit 310 of the IC chip 300 through the metal bumps 320, thus achieving the electric connection between the fingerprint sensing circuit 310 of the IC chip 300 and the external circuit board 50, thus transmitting the sensed mutual capacitance signal of the fingerprint sensing circuit 310 out of the IC chip 300.

Figure 7:
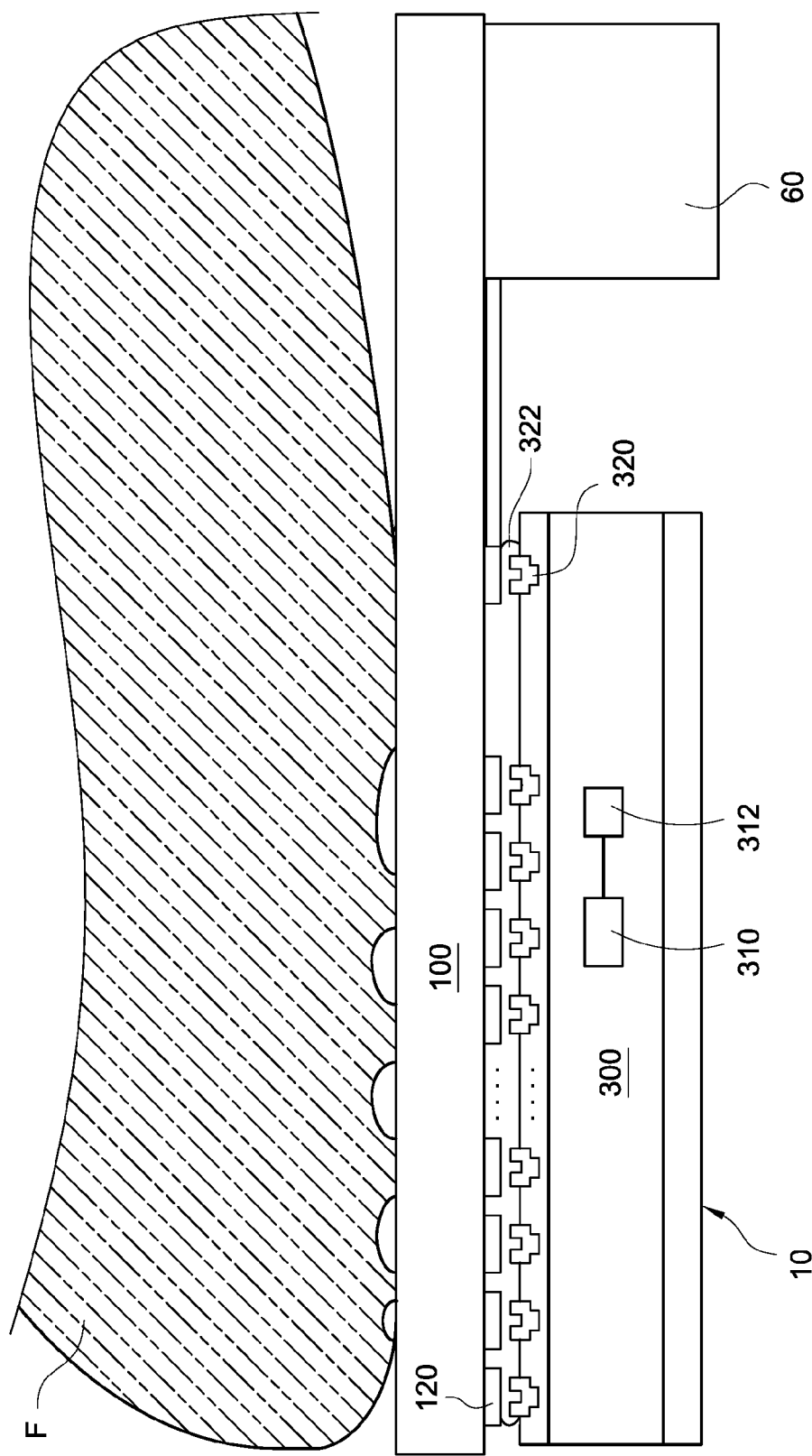
FIG. 7 is a sectional view of the fingerprint recognition apparatus according to the fifth embodiment of the present invention.

FIG. 7 is a sectional view of the fingerprint recognition apparatus according to the fifth embodiment of the present invention, and the embodiment shown in FIG. 7 is similar to that shown in FIG. 2. However, the external circuit board 50 shown in FIG. 2 is replaced by an electronic device 60 shown in FIG. 7. The electronic device 60 can be integrated circuit in COG or COF package. Moreover, even though not particularly illustrating, the top view for the embodiment shown in FIG. 7 can be referred to those shown in FIGS. 3 to 6. Therefore, further description regarding the embodiment in FIG. 7 is omitted here for brevity. In the embodiments shown in FIGS. 4 to 7, the electrode-and-wiring substrate 100 can be glass substrate (such as protection glass of display apparatus), ceramic substrate, sapphire substrate or polymer film. The thickness of the electrode-and-wiring substrate 100 can be reduced to several micro meters, which is one order of magnitude less than that of sealing resin 150A. The sealing resin 150A needs thickness of tens of micro meters to protect the lead-out wires 130A. Therefore, the fingerprint recognition apparatus 10 of the present invention has enhanced measurement sensitivity and lower cost.

Figure 8:
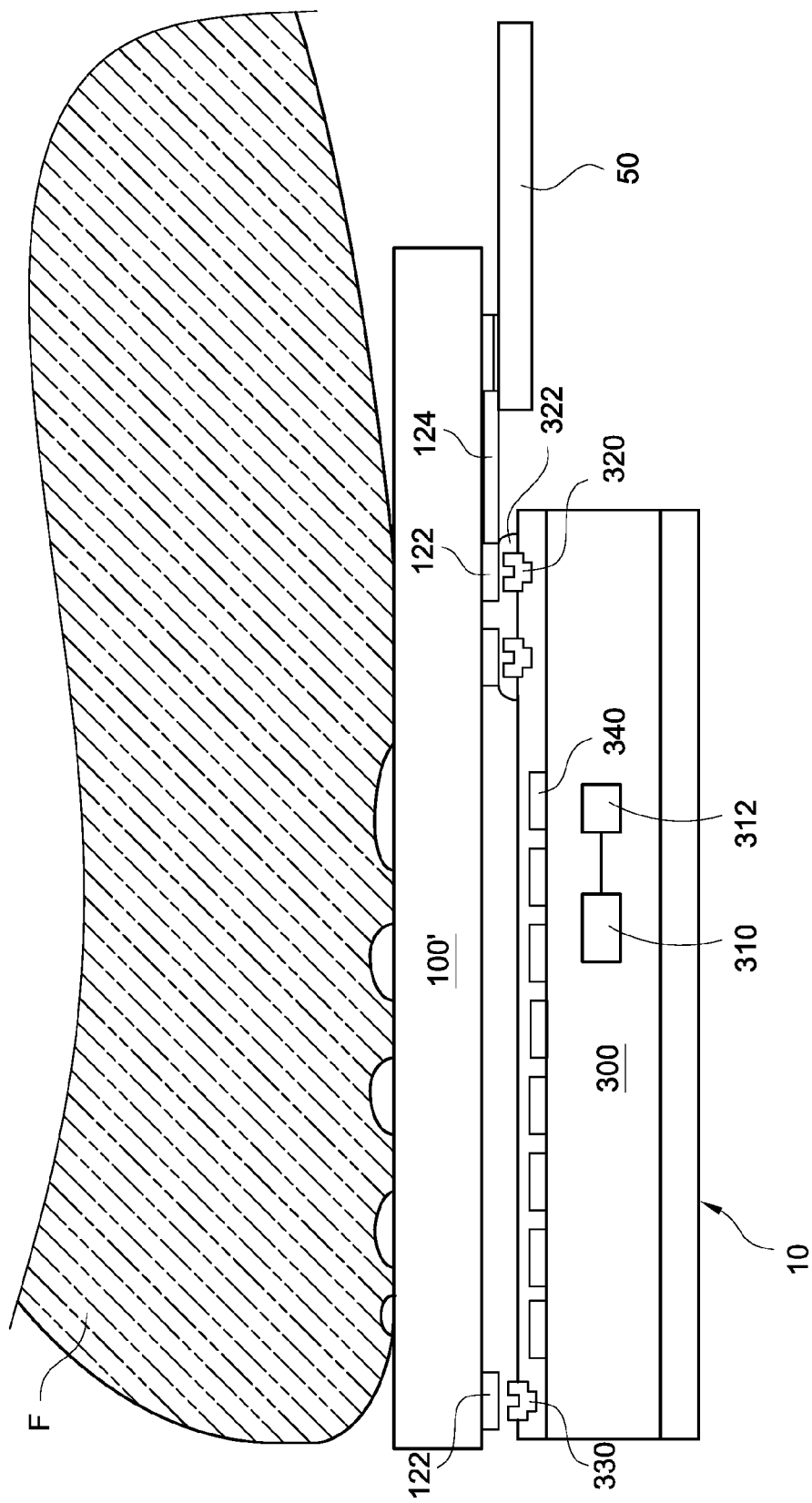
FIG. 8 is a sectional view of the fingerprint recognition apparatus according to the sixth embodiment of the present invention.

FIG. 8 is a sectional view of the fingerprint recognition apparatus according to the sixth embodiment of the present invention, and the embodiment shown in FIG. 8 is similar to that shown in FIG. 2. However, the electrode-and-wiring substrate 100 shown in FIG. 2 is replaced by a wiring substrate 100' shown in FIG. 8, and the IC chip 300 in FIG. 8 further comprising sensing electrodes 340. The sensing electrodes 340 can be implemented with the layout as the self-capacitance sensing electrodes shown in FIG. 3, the mutual-capacitance sensing electrodes shown in FIG. 4, or the mutual-capacitance sensing electrodes constituted by grouping a plurality of sensing electrodes as shown in FIG. 5. Similar to those embodiments shown in FIGS. 2-6, the wiring substrate 100' further comprises a plurality of conductive pads 122 and a plurality of conductive wires 124. At least part of the conductive pads 122 are electrically connected with the conductive pads 52 of the external circuit board 50 and another part of the conductive pads 122 are electrically connected with the metal bumps 320 and further electrically connected with the fingerprint sensing circuit 310 of the IC chip 300 through the metal bumps 320, thus achieving the electric connection between the fingerprint sensing circuit 310 of the IC chip 300 and the external circuit board 50, thus transmitting the sensed self-capacitance signal or mutual-capacitance signal of the fingerprint sensing circuit 310 out of the IC chip 300. Moreover, in the embodiment shown in FIG. 8, the conductive pads 122 do not cover the top surface of the IC chip from projected view. For balance sake of package, the IC chip 300 can be optionally provided with balancing metal bumps 330, which are away from the conductive pads 122 having actual electric connection with the metal bumps 320. The balancing metal bumps 330 are only used for providing balance and need not to have actual electric connection with the metal bumps 320 (for example, the electric connection with the metal bumps 320 is achieved through ACF 322). However, depending on processing requirement, the balancing metal bumps 330 can also be connected to floating conductive pads 122 through ACF.

Figure 9:
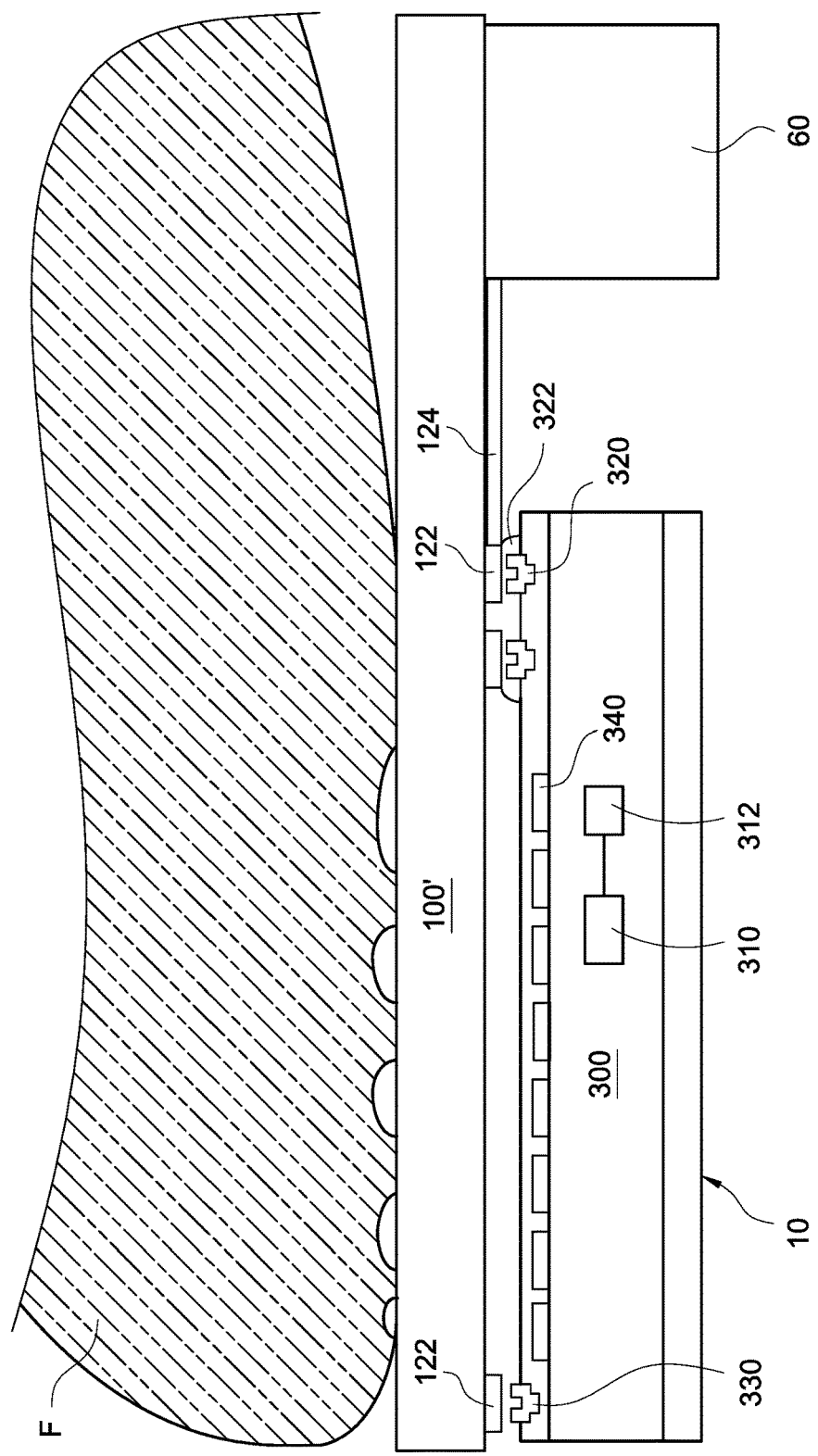
FIG. 9 is a sectional view of the fingerprint recognition apparatus according to the seventh embodiment of the present invention.

FIG. 9 is a sectional view of the fingerprint recognition apparatus according to the seventh embodiment of the present invention, and the embodiment shown in FIG. 9 is similar to that shown in FIG. 8. However, the external circuit board 50 shown in FIG. 8 is replaced by an electronic device 60 shown in FIG. 7. The electronic device 60 can be integrated circuit in COG or COF package. Moreover, even though not particularly illustrating, the sensing electrodes 340 can be implemented with the layout as the self-capacitance sensing electrodes shown in FIG. 3, the mutual-capacitance sensing electrodes shown in FIG. 4, the mutual-capacitance sensing electrodes constituted by grouping a plurality of sensing electrodes as shown in FIG. 5. Similar to the embodiment shown in FIG. 8, for balance sake of package, the IC chip 300 can be optionally provided with balancing metal bumps 330, which are away from the conductive pads 122 with actual electric connection with the metal bumps 320. The balancing metal bumps 330 are only used for providing balance and need not to have actual electric connection with the metal bumps 320 (for example, the electric connection with the metal bumps 320 is achieved through ACF 322). However, depending on processing requirement, the balancing metal bumps 330 can also be connected to floating conductive pads 122 through ACF.

To sum up, the present invention has following advantages:

1. The present invention provides an innovative fingerprint recognition apparatus architecture. At least part of the sensing electrodes on the fingerprint recognition IC chip are moved to another substrate, thus effectively thinning the substrate and enhancing sensibility.

2. The fingerprint recognition IC chip is used with a wiring substrate such that the fingerprint sensing circuit in the fingerprint recognition IC chip can be electrically connected with the external circuit or the external circuit board, thus reducing package cost and enhancing the flexibility of the fingerprint recognition apparatus.

Thus, particular embodiments have been described. Other embodiments are within the scope of the following claims. For example, the actions recited in the claims may be performed in a different order and still achieve desirable results.

What is claimed is:

1. A fingerprint recognition apparatus, comprising:
an electrode-and-wiring substrate having two main surfaces opposite to each other, where one main surface is in proximity to user finger and the electrode-and-wiring substrate has a plurality of sensing electrodes on the other main surface, wherein the electrode-and-wiring substrate is formed as a single plate structure, and a sensing area corresponding to the user finger is formed on the other main surface of the electrode-and-wiring substrate, and the plurality of sensing electrodes are within the sensing area; and
an integrated circuit (IC) chip having a fingerprint sensing circuit and a plurality of metal bumps, at least part of the metal bumps electrically connected with the fingerprint sensing circuit and corresponding sensing electrodes on the electrode-and-wiring substrate, whereby the fingerprint sensing circuit is electrically connected to the sensing electrodes.

2. The fingerprint recognition apparatus in claim 1, wherein an area of each of the metal bumps is not larger than an area of corresponding one of the sensing electrodes.

3. The fingerprint recognition apparatus in claim 1, wherein the electrode-and-wiring substrate further comprises a plurality of conductive pads and a plurality of conductive wires, wherein at least one of the conductive pads is electrically connected to another part of the metal bumps to transmit sensing signal of the IC chip outside the IC chip.

4. The fingerprint recognition apparatus in claim 3, wherein part of the conductive pads of the electrode-and-wiring substrate are electrically connected to a flexible printed circuit board or a rigid printed circuit board.

5. The fingerprint recognition apparatus in claim 3, further comprising an electronic device electrically connected with the electrode-and-wiring substrate, the electronic device electrically connected with the fingerprint sensing circuit of the IC chip through the conductive wires, the conductive pads and the metal bumps.

6. The fingerprint recognition apparatus in claim 1, wherein the electrode-and-wiring substrate is a glass substrate, a ceramic substrate or a sapphire substrate.

7. The fingerprint recognition apparatus in claim 6, wherein the glass substrate is a protection glass of a display apparatus.

8. The fingerprint recognition apparatus in claim 1, wherein the electrode-and-wiring substrate is a polymer film.

9. The fingerprint recognition apparatus in claim 1, wherein the IC chip has switch circuit therein to set the sensing electrodes into longitudinal sensing electrodes and transversal sensing electrodes.

10. The fingerprint recognition apparatus in claim 1, wherein the fingerprint sensing circuit is mutual-capacitance fingerprint sensing circuit or self-capacitance fingerprint sensing circuit.

11. The fingerprint recognition apparatus in claim 10, wherein the IC chip further comprises a plurality of sensing electrodes on a surface of the IC chip toward the electrode-and-wiring substrate, the sensing electrodes on the IC chip are arranged substantially perpendicular to the sensing electrodes on the electrode-and-wiring substrate, and wherein the sensing electrodes on the IC chip and the sensing electrodes on the electrode-and-wiring substrate are disposed on different planes.

12. A fingerprint recognition apparatus, comprising:
a wiring substrate having two main surfaces opposite to each other, where one main surface is in proximity to user finger and the wiring substrate has a plurality of conductive pads and conductive wires on the other main surface; and
an integrated circuit (IC) chip having a fingerprint sensing circuit, a plurality of sensing electrodes and a plurality of metal bumps, the fingerprint sensing circuit electrically connected with the sensing electrodes,
wherein the fingerprint sensing circuit is electrically connected with parts of the conductive pads and part of the conductive wires on the wiring substrate, whereby the fingerprint sensing circuit is electrically connected to an external electric circuit;
wherein the wiring substrate is formed as a single plate structure and completely covers a sensing area formed by the plurality of sensing electrodes on the integrated circuit (IC).

13. The fingerprint recognition apparatus in claim 12, wherein another part of the conductive pads of the wiring substrate are electrically connected to a flexible printed circuit board or a rigid printed circuit board.

14. The fingerprint recognition apparatus in claim 12, further comprising an electronic device electrically connected with the wiring substrate, the electronic device electrically connected with the fingerprint sensing circuit of the IC chip through the conductive wires, the conductive pads and the metal bumps.

15. The fingerprint recognition apparatus in claim 12, wherein the fingerprint sensing circuit is self-capacitance fingerprint sensing circuit.

16. The fingerprint recognition apparatus in claim 12, wherein the wiring substrate is a glass substrate, a ceramic substrate or a sapphire substrate.

17. The fingerprint recognition apparatus in claim 16, wherein the glass substrate is a protection glass of a display apparatus.

18. The fingerprint recognition apparatus in claim 12, wherein the wiring substrate is a polymer film.

19. The fingerprint recognition apparatus in claim 12, wherein the IC chip further comprises at least one balancing metal bump and the balancing metal bump is not electrically connected with the wiring substrate.

* * * * *